Oct. 25, 1938.  H. B. COOKE  2,134,325
MANUFACTURE OF GASOLINELIKE HYDROCARBONS
Filed Feb. 15, 1936
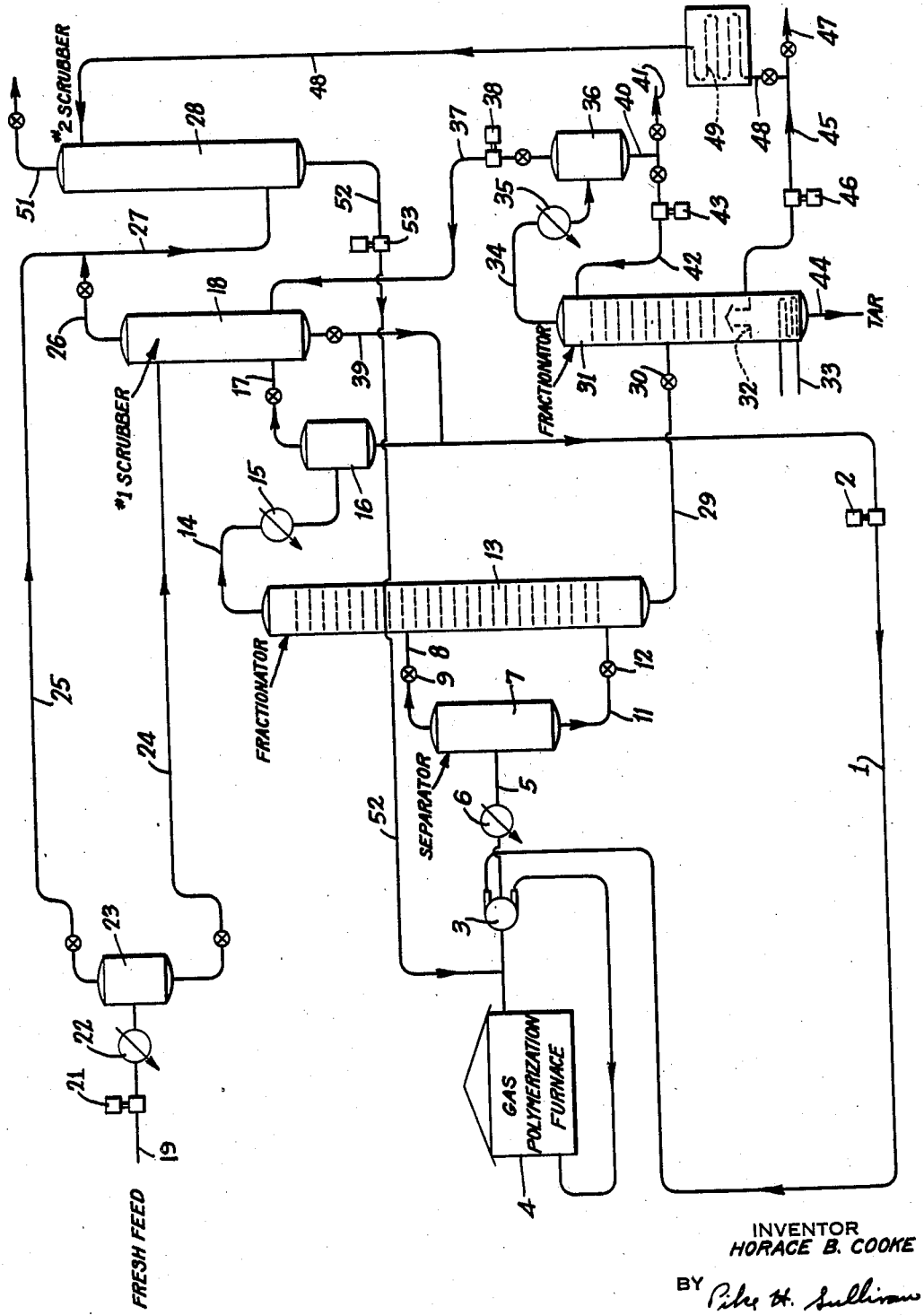
INVENTOR
HORACE B. COOKE
BY
ATTORNEY Patented Oct. 25, 1938

2,134,325

UNITED STATES PATENT OFFICE 2,134,325

MANUFACTURE OF GASOLINELIKE HYDRO-CARBONS

Horace B. Cooke, Greenwich, Conn., assignor to Process Management Company, Inc., New York, N. Y., a corporation of Delaware Application February 15, 1936, Serial No. 64,070

8 Claims. (Cl. 196—10)

This invention relates to the conversion of normally gaseous hydrocarbons to normally liquid hydrocarbons, and particularly to the conversion of hydrocarbons containing both saturated and unsaturated constituents of from two to four carbon atoms per molecule to normally gasoline-like constituents of high anti-knock value.

My invention contemplates processing normally gaseous hydrocarbons of the above character, obtained, for instance, from a vapor phase cracking unit or other sources. In accordance with my process, normally gaseous hydrocarbons of the above character constituting the fresh feed to the unit are forced by mechanical force, and with appropriate cooling, to a high-pressure separator wherein a liquefied gas fraction and a gaseous fraction are separated. The liquefied gas fraction containing principally hydrocarbons of three and four carbon atoms per molecule is withdrawn from the bottom of the high-pressure separator and passed to a primary scrubber as an absorbing medium for unreacted gases from the polymerization system. The liquefied gas absorbs valuable constituents from the unreacted hydrocarbon gases, and the enriched absorbing medium, in admixture with other liquefied normally gaseous hydrocarbons from the polymerization system, is subjected to polymerizing conditions of temperature and pressure to effect the desired conversion thereof into gasoline-like constituents. The products of polymerization after being appropriately cooled are separated in a high-pressure separator, preferably maintained under substantially the same pressure as the heating zone, into a liquid fraction and a gaseous and/or vaporous fraction, these fractions being separately passed from the high-pressure separator to a fractionator at different elevations. The gaseous and/or vaporous fraction and the liquid fraction entering the common fractionating zone are therein fractionated to obtain a normally gaseous fraction containing hydrogen, methane, and saturated and unsaturated hydrocarbons of from two to four carbon atoms per molecule, and a liquid fraction containing gasoline-like constituents and heavier oil. The gaseous fraction removed from the fractionator at an upper portion thereof is cooled and unliquefied constituents therefrom are passed through the primary scrubber for recovery of valuable constituents therefrom. The liquid fraction formed in the fractionator is withdrawn from the bottom thereof and further fractionated to separate gasoline-like constituents from heavier oil contained therein, a part at least of the heavier oil being passed to a secondary scrubber receiving gases released from the primary scrubber, as well as gases released from the separator receiving the fresh feed gases. In the secondary scrubber, a final clean-up of the gaseous constituents passing therethrough is accomplished. The fixed gases comprising mostly hydrogen and methane, and a controlled amount of ethane if it is desired to remove part of the $C_2$ fraction from the system, are discharged from the system at an upper portion of the secondary scrubber, and the unreacted scrubbing oil containing dissolved hydrocarbon gases therein is utilized as a cooling medium which is intimately contacted with the hot products of polymerization leaving the polymerization zone.

In order to make my invention more clearly understood, I have shown in the accompanying drawing, means for carrying the same into practical effect without limiting the improvements in their useful applications to the particular embodiment which, for the purpose of explanation, has been made the subject of illustration.

In the drawing, the single figure is a somewhat diagrammatic elevational view of apparatus capable of carrying out my invention.

Referring to the drawing, normally gaseous hydrocarbons in liquid condition containing both saturated and unsaturated constituents of from two or three to four carbon atoms per molecule are conducted from a suitable source of supply, as will be hereinafter explained, through a line I and a heat exchanger 3 by a pump 2 to a suitable gas polymerization furnace 4. The normally gaseous hydrocarbons of the above character passing through the furnace 4 as a stream of restricted cross-sectional area are subjected therein to polymerizing conditions of temperature and pressure to effect conversion thereof into normally liquid gasoline-like constituents. The stream of normally gaseous hydrocarbons is preferably heated in the furnace 4 to a temperature of between about 750° F. to 1250° F. while being maintained under a superatmospheric pressure of from 400 lbs. per sq. in. to 3000 lbs. per sq. in., or higher. The products of polymerization leaving the polymerization furnace 4 are passed through a line 5 wherein they are appropriately cooled by intimate contact with enriched absorbent oil from a line 52, passage through the heat exchanger 3 and a cooler 6 which may, if desired, be of the refrigeration type, that is, a cooler wherein normally gaseous hydrocarbons are expanded and the cold resulting from the expansion thereof is utilized as a cooling source for the products of polymerization. The thus cooled products of polymerization, at a temperature below which active polymerization takes place and including the enriched oil introduced directly thereinto through the line 52, are conducted to a high-pressure separator 7 maintained under substantially the same superatmospheric pressure as the furnace 4.

The products entering the high-pressure separator 7 are therein separated into gaseous and liquid fractions, the gaseous fraction being withdrawn through a line 8 controlled by a pressure-reduction valve 9 and the liquid fraction being withdrawn through a line 11 controlled by a valve 12. These fractions enter a common fractionator 13, maintained under a pressure of from about 100 to 400 lbs. per sq. in. and provided with suitable fractionating trays or plates, at different elevations and are therein fractionated to separate a normally gaseous fraction containing hydrogen, methane, and saturated and unsaturated hydrocarbons of from two to four carbon atoms per molecule, and a liquid fraction containing the polymerized gasoline-like constituents and heavier oil which collects in the lower portion of the fractionator. The normally gaseous fraction separated in the fractionator 13 is passed through a line 14 and condenser 15 to an accumulator or receiver 16. In passing through the condenser 15, part of the normally gaseous hydrocarbons is liquefied. The liquefied hydrocarbons may be reprocessed to gasoline-like constituents and may comprise part, at least, of the recycle stock being returned to the polymerization furnace 4 through the line 1. Part of the liquefied hydrocarbons may be returned to the fractionator 13 as reflux therefor.

Unliquefied gaseous hydrocarbons entering the receiver 16 and containing hydrogen, methane, and some of the more valuable heavier hydrocarbons, are withdrawn therefrom through a line 17 and passed to a primary scrubber 18 wherein they are scrubbed to remove valuable constituents therefrom.

My invention contemplates utilizing part of the fresh gases introduced into the system as feed stock as a liquid scrubbing medium for the unreacted gases passing upwardly through the scrubber 18. As shown, fresh feed gases from any suitable source and containing hydrogen, methane, and saturated and unsaturated hydrocarbons of from two to four carbon atoms per molecule, are introduced through a line 19 and forced by a pump 21 through a cooler 22 wherein the compressed gases are cooled. The cooler 22 may be of the refrigeration type, thereby cooling the fresh feed gases to a temperature sufficiently low to liquefy a part thereof. The thus cooled gases are passed to a separator 23, maintained at a pressure of about 100 to 400 lbs. per sq. in., wherein separation between the liquefied gases and others is accomplished. The liquefied gases which comprise principally hydrocarbons containing three and four carbon atoms per molecule are withdrawn through the separator 23 and passed through a line 24 to the upper portion of the primary scrubber 18. These liquid gases under the conditions prevailing in the scrubber 18 remain in liquid condition and absorb unreacted gases passing upwardly therethrough of valuable constituents. Unreacted gases separated in the separator 23 are passed through a line 25 and are mixed with unreacted gases passing through a line 26 from the scrubber 18, the admixed gases passing through a line 27 to a secondary scrubber 28 maintained at a pressure of from 50 to 300 lbs. per sq. in. The gases entering the secondary scrubber 28 are therein scrubbed with absorbent heavier than the liquefied gases utilized as a scrubbing medium in the primary scrubber 18, the source of the absorbent being hereinafter explained.

Returning now to the fractionator 13, the liquid fraction separated therein and comprising the polymerized gasoline-like constituents and heavier oil is withdrawn from the bottom of the fractionator 13 and passed through a line 29, controlled by a pressure-control valve 30, to a fractionator 31 maintained at a pressure of about 25 to 100 lbs. per sq. in. and having an intermediate trap-out tray 32 and a suitable reboiling means 33 at the bottom thereof. The liquid fraction entering the fractionator 31 is therein fractionated to separate the gasoline-like constituents and any lighter products as an overhead fraction from the heavier oils. The overhead gasoline fraction is withdrawn from the fractionator 31 through a line 34 and passes through a condenser 35 to a gasoline receiver 36. Gaseous constituents contained in the overhead fraction may be removed from the upper portion of the receiver 36 and passed through a line 37 by a pump 38 to the lower portion of the scrubber 18 wherein they are scrubbed as above described. The gaseous constituents passing through the line 37 may, if desired, be conducted to the fractionator 13. Gasoline-like hydrocarbons are withdrawn from the receiver 36 through a line 40 and part sent to storage through a line 41. Another part of the gasoline-like hydrocarbons may be passed through a line 42 by a pump 43 to the upper part of the fractionator 31 as reflux therefor.

The liquefied gaseous hydrocarbons entering the scrubber 18 through line 24 and the unreacted gases from the polymerization system dissolved therein are withdrawn from the scrubber 18 through a line 39 and mixed with the gaseous hydrocarbons passing through the line 1 to the inlet of the furnace 4. If desired, the hydrocarbons passing through the line 39 may be passed to the receiver 16 from which a composite feed for the furnace 4 may be withdrawn.

Oils heavier than the gasoline-like constituents separated in the fractionator 31 are further separated into tar and a relatively clean gas oil. This separation may be accomplished within the fractionator 31, the tar being withdrawn therefrom through a line 44 after lighter constituents therein are driven off by heat from the steam coil 33. A relatively clean gas oil resulting from the polymerization of the normally gaseous hyrocarbons, as well as gas oil which may be initially introduced into the system during the starting-up operation, is collected within the fractionator 31 on the trap-out tray 32 and withdrawn therefrom through a line 45. A part of the relatively clean gas oil may be discharged from the system through a line 47. The remainder or all of the gas oil may be forced by a pump 46 through a line 48, in which is interposed a suitable cooler 49, to the upper portion of the secondary scrubber 28. This relatively clean gas oil passing downwardly in the scrubber 28 contacts the gaseous constituents entering through the line 27 and removes the remaining valuable hydrocarbon constituents from the gases. Undissolved gases containing mostly hydrogen and methane, and controlled amounts of ethane if it is desired to remove part of the ethane from the system, are discharged from the scrubber 28 through a valve-control line 51.

The relatively clean gas oil containing dissolved normally gaseous hydrocarbons therein is passed through a line 52 by a pump 53 to the line 5 to intimately contact the hot products of polymerization leaving the furnace 4.

As a modification, the gaseous and liquid fractions separated within the separator 7 and passing through the lines 8 and 11, respectively, may be separately fractionated under different pressures, if desired, in the manner shown in the Gary, et al. application S. N. 63,998, filed February 15, 1936. The overhead normally gaseous fraction from each of the fractionators may be passed to a stabilizing column having top cooling means, bottom heating means, and a trap-out tray at an intermediate point. Liquefied gas passing through the line 24 will enter this type of stabilizer and scrub the upwardly rising gases therein. Liquefied gases containing from two or three to four carbon atoms per molecule collect on the intermediate trap-out tray and are withdrawn therefrom as charging stock which passes through the line 1 to furnace 4. In this type of stabilizer, the liquefied gases overflow the intermediate trap-out tray and descend to the bottom of the stabilizer where they are gently heated to drive off light constituents, such as hydrocarbon gases containing two and three carbon atoms per molecule. The remaining liquefied gas in the bottom of the stabilizer, containing mostly hydrocarbons of four carbon atoms per molecule and controlled amounts of hydrocarbons of three carbon atoms per molecule, after cooling, are returned to the upper portion of the stabilizer as a refluxing medium therefor. Undissolved gases leaving the top of the stabilizer are conducted to the secondary scrubber 28.

It will be understood by those skilled in the art that, while I have described my invention with preferred operating examples, it is not limited in its broader aspects to such operating details as have been set forth hereinabove by way of example, but may variously be practiced and embodied within the scope of the claims hereinafter made.

I claim:

1. A process of producing normally liquid gasoline-like constituents from normally gaseous hydrocarbons comprising saturated and unsaturated constituents which comprises subjecting normally gaseous hydrocarbons comprising saturated and unsaturated constituents to elevated temperatures and pressures to effect polymerization thereof into gasoline-like constituents, separating the products of polymerization into a normally gaseous fraction and a normally liquid fraction, passing at least a part of the normally gaseous fraction to a scrubbing zone, introducing normally gaseous hydrocarbons under pressure sufficient to liquefy heavy constituents thereof into the system as fresh charging stock therefor, effecting a separation between liquefied heavy constituents and gaseous constituents of the fresh charging stock, passing the liquefied constituents directly to the scrubbing zone as a liquid absorbent for the gases passing therethrough, subjecting the liquid absorbent and gases contained therein to elevated temperatures and pressures to effect polymerization thereof into normally liquid gasoline-like constituents, passing unabsorbed gases from said scrubbing zone to a second scrubbing zone, separating the normally liquid fraction resulting from polymerization into a gasoline-like fraction a heavier oil fraction, and passing said heavier oil fraction to the second scrubbing zone as a liquid absorbent therefor, and admixing the heavier oil fraction containing absorbed gases from the second scrubbing zone with products of polymerization prior to separation thereof 2. A process of producing normally liquid gasoline-like constituents from normally gaseous hydrocarbons comprising saturated and unsaturated constituents which comprises subjecting normally gaseous hydrocarbons comprising saturated and unsaturated constituents to elevated temperatures and pressures to effect polymerization thereof into gasoline-like constituents, separating the products of polymerization into a normally gaseous fractioon and a normally liquid fraction, passing at least a part of the normally gaseous fraction to a scrubbing zone, introducing normally gaseous hydrocarbons under pressure sufficient to liquefy heavy constituents thereof into the system as fresh charging stock therefor, effecting a separation between liquefied heavy constituents and gaseous constituents of the fresh charging stock, passing the liquefied constituents directly to the scrubbing zone as a liquid absorbent for the gases passing therethrough, subjecting the liquid absorbent and gases contained therein to elevated temperatures and pressures to effect polymerization thereof into normally liquid gasoline-like constituents, passing unabsorbed gases from said scrubbing zone to a second scrubbing zone, separating the normally liquid fraction resulting from polymerization into a gasoline-like fraction and a heavier oil fraction, passing said heavier oil fraction to the second scrubbing zone as a liquid absorbent therefor, withdrawing the heavier oil fraction containing absorbed gaseous constituents from the second scrubbing zone and intimately contacting same with said hot products of polymerization to thereby cool said hot products of polymerization.

3. A process in accordance with claim 1 wherein the normally gaseous fraction separated from the products of polymerization are cooled to liquefy a portion thereof, the unliquefied portion passing to said scrubbing zone.

4. A process in accordance with claim 1 wherein the liquid absorbent and gases contained therein are polymerized in admixture with the normally gaseous hydrocarbons first mentioned.

5. A process of producing normally liquid gasoline-like constituents from normally gaseous hydrocarbons which comprises subjecting said normally gaseous hydrocarbons to elevated temperatures and pressures to effect polymerization thereof into gasoline-like constituents, separating the products of polymerization into a normally gaseous fraction and a normally liquid fraction, passing at least a part of the normally gaseous fraction to a scrubbing zone, introducing normally gaseous hydrocarbons under pressure sufficient to liquefy heavy constituents thereof into the system as fresh charging stock therefor, effecting a separation between liquefied heavy constituents and gaseous constituents of the fresh charging stock, passing the liquefied constituents directly to the scrubbing zone as a liquid absorbent for the gases passing therethrough, subjecting the liquid absorbent and gases contained therein to elevated temperatures and pressures to effect polymerization thereof into normally liquid gasoline-like constituents, passing unabsorbed gases from said scrubbing zone to a second scrubbing zone, introducing a hydrocarbon oil into the second scrubbing zone as a liquid absorbent therefor, and admixing said hydrocarbon oil containing absorbed gases from the second scrubbing zone with products of polymerization prior to separation thereof.

6. In a process for producing normally liquid gasoline-like hydrocarbons from normally gaseous hydrocarbons wherein said normally gaseous hydrocarbons are subjected to elevated conditions of temperature and pressure to effect conversion thereof into normally liquid hydrocarbons and the products of conversion are separated into said normally liquid products containing gasoline-like constituents and normally gaseous hydrocarbons, the improvement which comprises contacting the products of conversion with an absorption medium containing dissolved normally gaseous hydrocarbons, recovering said dissolved normally gaseous hydrocarbons with normally gaseous hydrocarbons separated from the products of conversion, passing recovered normally gaseous hydrocarbons to a zone wherein a fraction predominating in hydrogen and methane is separated therefrom, introducing liquefied normally gaseous hydrocarbons from an extraneous source and substantially free of normally liquid oil into said zone to contact said recovered normally gaseous hydrocarbons and aid in separation of said hydrogen and methane fraction and to collect liquefied normally gaseous hydrocarbons suitable for conversion and subjecting liquefied normally gaseous hydrocarbons thus obtained to conversion.

7. A process in accordance with claim 6 wherein the products of conversion, prior to separation thereof, are passed in heat exchange relation with liquefied normally gaseous hydrocarbons being charged to the process.

8. The method in accordance with claim 6 wherein said hydrogen and methane fraction is withdrawn from said zone and passed through an absorption zone in intimate contact with a liquid absorption medium to recover convertible hydrocarbon gases contained in said fraction, and said liquid absorption medium with convertible hydrocarbon gases absorbed therein is admixed with products of said conversion treatment prior to fractionation thereof whereby gaseous constituents absorbed in said medium are recovered with normally gaseous constituents of said conversion products for further processing therewith.

HORACE B. COOKE.